Feb. 1, 1927.

H. J. V. KLOO 1,616,225

THINNING MACHINE

Filed Oct. 20, 1925    2 Sheets-Sheet 1

INVENTOR.
HJV. Kloo
BY Marks & Clark
ATTORNEYS.

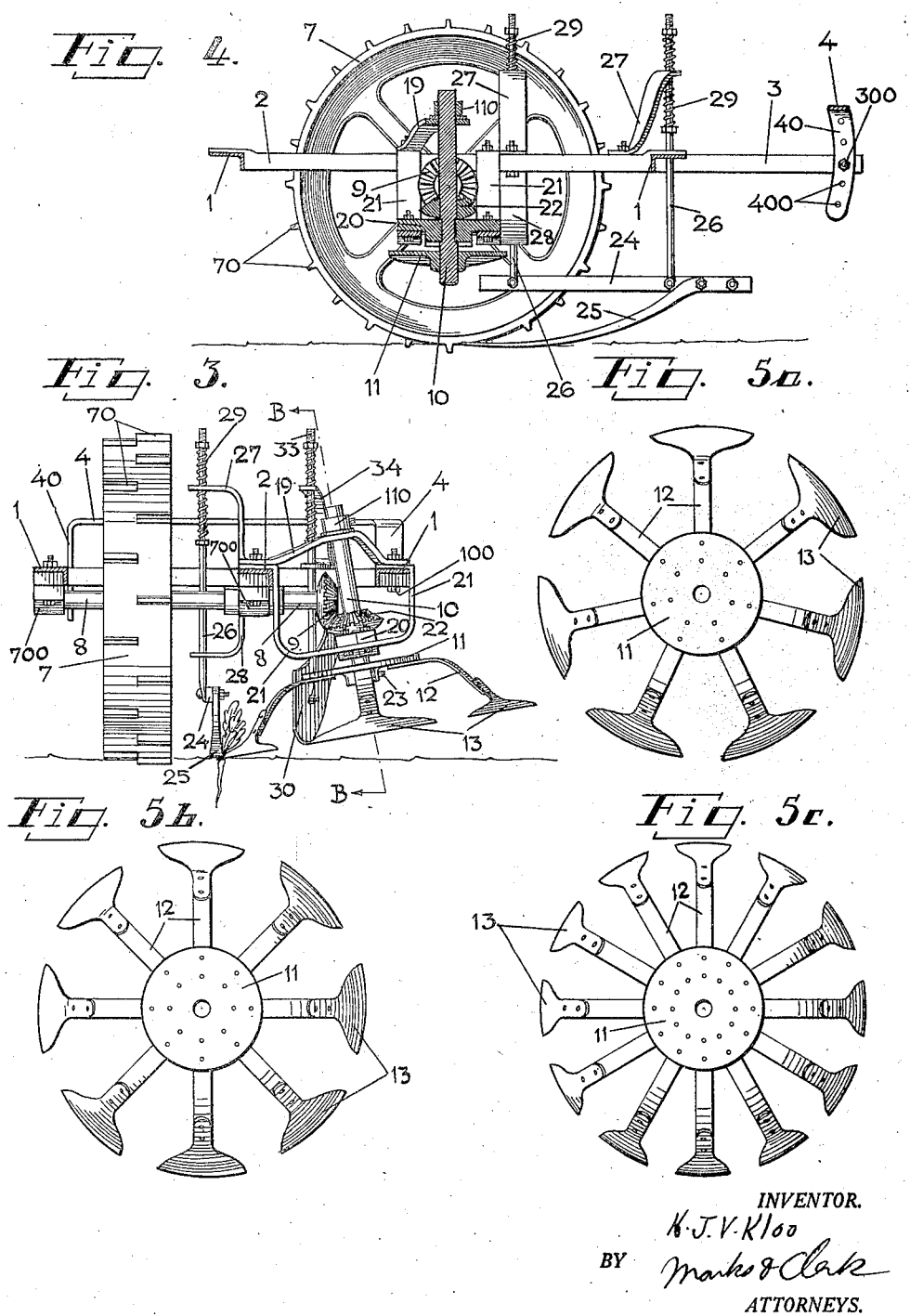

Patented Feb. 1, 1927.

1,616,225

UNITED STATES PATENT OFFICE.

HUGO J. V. KLOO, OF HELAS, SWEDEN.

THINNING MACHINE.

Application filed October 20, 1925, Serial No. 63,752, and in Sweden November 3, 1924.

My invention relates to new and useful improvements in machines for thinning plants of such character as are planted in rows as for instance beets or similar vegetables. One object of this invention is to provide means for a commodious and efficient thinning of such plants. Another object of this invention is to provide means by which different kinds of plants can be thinned.

A further object of the invention is to provide means for a commodious thinning of the plants, so that the groups of the retained plants may be given a desired extension.

Another object of the invention is to protect the cutting implement from damage when meeting hard objects in the earth.

Further objects of the invention may be clearly understood by the following description.

Figure 1:
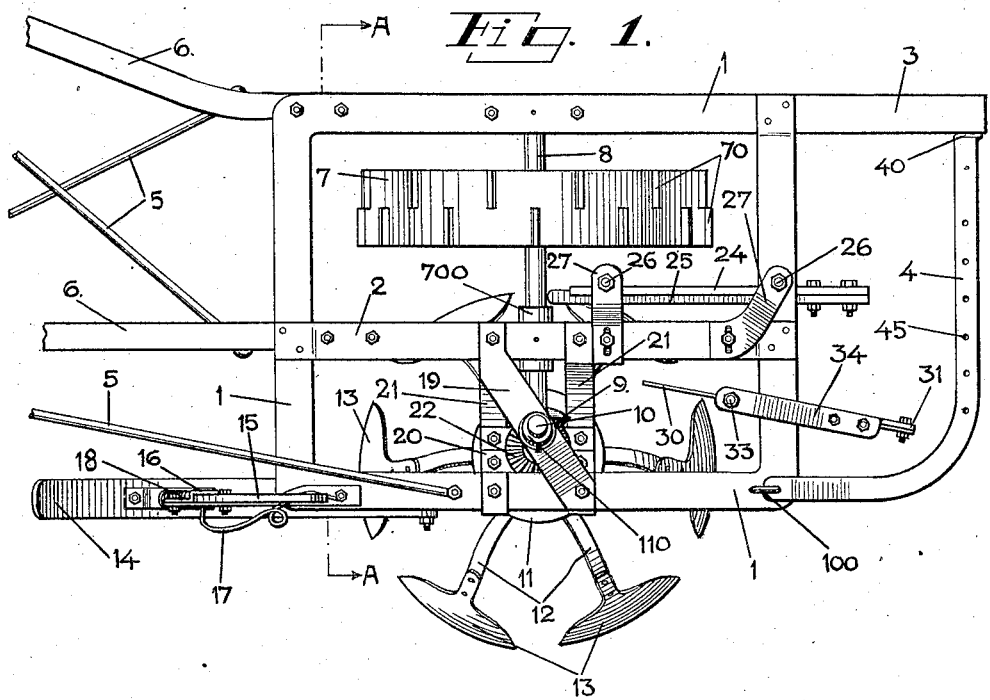
Figure 2:
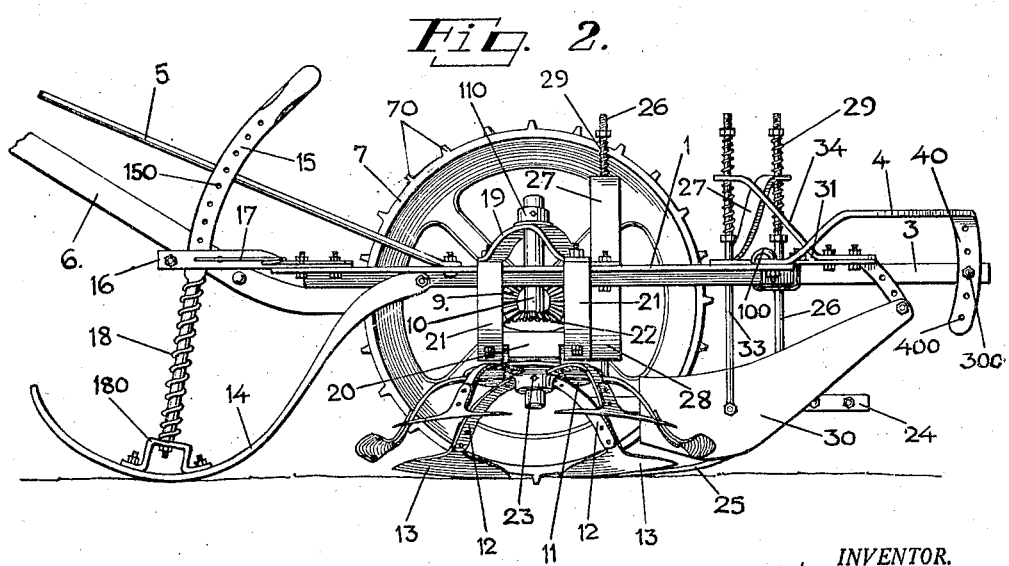

My invention consists in certain novel features of construction, arrangement and combination of parts as will be hereinafter fully described and ascertained in claims, reference being made to the accompanying drawing in which:

Figure 1 is a plan view of the improved device. Figure 2 is a side elevation thereof. Figure 3 is a square-section thereof on line A—A in Figure 1. Figure 4 is a longitudinal section on line B—B in Figure 3. Figures 5ª, 5ᵇ, 5ᶜ are some various modifications of the cutting implement.

Referring more specifically to the drawing the machine is shown as comprising a body portion or frame 1 built up of angle- or channel bars and supporting the other parts of the machine. The frame comprises a centre bar 2 and on the one side an extension 3 from the end of which a rearwards bent cross bar 4 goes to the opposite side bar of the frame and is fastened therewith by a hook 100 as shown in Figs. 1, 2 and 3. The rear-end 40 of the cross bar 4 is deflected downwardly and provided with a plurality of holes 400. By means of these holes the cross bar 4 can be shifted to various heights and be temporarily fastened to the extension 3 by a screwbolt 300 through any desired hole 400. The centre portion of the bar 4 also is provided with a plurality of holes 45 to receive a coupling bolt for the attachment of a drag rod not shown in the drawing. On account of these two sets of holes 400 and 45 said drag rod can be attached in various positions laterally as well as vertically to secure a good travel of the machine when pulled by an animal or a man.

From the rear of the frame 1 there project two handle bars 6, which are somewhat displaced to the left, so that the man in charge can walk on the side of the row to be thinned. The handle bars 6 are provided with tie rods 5 as shown in Figs. 1 and 2. The machine is supported by one travelling wheel 7, that also drives a cutting implement and for that purpose is provided on its rim with ribs 70 or similar projections to prevent the wheel from slipping in the ground while operative. The travelling wheel 7 is mounted on a main axle 8, journaled in bearings 700 in the centre bar 2 as well as in the one side bar of the frame, so that the wheel 7 can be laterally displaced on the axle 8 and adjusted to a suitable distance apart from the row being thinned. On the end of the axle 8 opposite to that, where the wheel 7 is mounted, there is a toothed bevel gear 9 attached to the axle 8, which meshes with a toothed bevel wheel 22, that is fixed on a shaft 10, which is somewhat inclined towards the vertical longitudinal plane through the machine. At the lower end of the shaft 10 the rotary cutting implement is attached. This implement comprises a hub 11 with radially projecting arms 12, the outer end of each arm being deflected downwardly and supports a knife 13 made of a thin steel plate. The knives 13 are given a segmental form, the edges of them constituting parts of a common circular line, the centre of which lies in the centre of shaft 10 and which circle line has its plane inclined some 9 to 10 degrees to the horizontal plane as shown in Figure 3, which inclination depends on the inclination of the shaft 10. By this inclined position of the shaft 10 the knife 13 which for the moment is nearest to the travelling wheel 7, will cut down about one inch into the earth, when the shaft 10 becomes revolved by the bevel gears 9, 22. The upper end of the shaft 10 by means of a collar 110 is supported by a bent bar 19, fastened obliquely between the adjacent side bar of the frame 1 and the centre bar 2 as shown in Figs. 1 and 2. Between the hub 11 and bevel wheel 22 the shaft 10 is journaled in a bearing 20, supported by two parallel and bent irons 21, which are fixed by means of bolts to the same parts of the frame as is the bar 19. The bevel wheel 22 is situated closely above the bearing 20, so that the bearing 20 can take up the thrust from said bevel wheel. The hub 11 is made of cast iron, and is adjustably fixed upon the shaft 10 by means of a set screw 23, for the purpose to use the cutting implement on any desired depth, thinning "drilled" plants as well as on plain ground.

The cutting implement can be provided with various numbers of knives 13, the cutting width of which can be varied also, so that the distance between the plants or groups of plants left can be chosen in accordance with the kinds of plants. This is clearly to be seen in Figs. 1, 5ª, 5ᵇ and 5ᶜ. The machine shown in Fig. 1 is provided with six knives 13 and is suited for "swedes" with a distance between the retained plants of some ten inches. The cutting implement in Fig. 5ª with seven knives is to be used for rapes, the implement in Fig. 5ᵇ with eight knives for beets and the other implement in Fig. 5ᶜ with twelve knives for carrots. The distances between the retained plants will be respectively some eight, seven and five inches. The distance between two consecutive knives may be nearly the same for all kinds of plants with some two or three inches, which distance consequently is the length of the retained groups of plants.

In the practice it is the most convenient to have a special cutting implement for each kind of plants.

A sledge 25—about ¼ inch thick and one inch broad—is provided and adapted to slide along the side of the plant row on a depth of about ⅜ inch into the earth. The knives 13 operate against this sledge passing below the same as shown in Figs. 1 and 3. The front end of the sledge is bent upwards and bolted to a supporting member 24, which is carried by two narrow iron rods 26. These rods are movable vertically through holes in two supports 27, which are fastened at the centre bar 2 and shaped as best shown in Figs. 3 and 4. The rear rod 26 slides also through a lower support 28 and the front rod 26 through the front member of the frame 1 as clearly to be seen in Fig. 4. The rods 26 are provided with spiral springs 29, which slightly force the sledge 25 downwards against the earth and the knives 13, so that the knives and the sledge 25 cooperate like a shear, through which the plants will be cut slightly beneath the ground. On account of the flexibility of the sledge 25 it will be possible for small objects to pass by between the sledge and the knives in order to save the machine from damage when meeting some hard objects in the ground.

30 designates a vertically disposed protecting plate movably carried at its forward end by a downwardly deflected support 31, attached to the front portion of the frame 1. The rear end of the plate 30 is supported by a spring actuated rod 33 sliding through a hole in a guide 34 and in the support 31. The plate 30 consequently can move up and down for the purpose to protect the knives 13 during their operation, preventing earth and cut parts of the plants from adhering to the revolving knives 13. At the right hand side of the machine there is a sledge 14, consisting of a curved flat bar, which is movably bolted to the frame 1 and to an arm 15, which is provided with a plurality of holes 150, by which the arm 15 and sledge 14 can be locked in various heights by a flexible pin 17. The lower end of the arm 15 slides in a hole in its holder 180 and the middle part of the arm slides in a guide 16 attached to the frame 1. The lower portion of the arm 15 is surrounded by a strong spiral spring 18, which acts against the holder 180 and serves as a flexible support for the machine to reduce shocks, secure a uniform travelling and adjust the operative depth for the cutting knives 13.

In use the revolving of the travelling wheel 7 is transmitted by means of the main axle 8, the bevel gears 9, 22 and the shaft 10 to the cutting implement, the same being rotated in such a manner, that each knife in cooperation with the sledge 25 at every revolution of the cutting implement cuts away a part of the plant row corresponding to the width of the knife, so that plants or small groups of plants remain on regular distance from each other. The protecting plate 30 prevents thereby the earth and the plants already cut from adhering to the revolving knives.

The mechanism herein illustrated and described is capable of considerable modification without departing from the principle of my invention.

Having thus described the invention, what I claim as new is:

1. In a machine of the class described in combination, a frame, a rotary main axle journaled in bearings in said frame, a travelling wheel on the main axle supporting said frame, a shaft inclined towards the vertical line and operated by said main axle through toothed gears and rotatably supported by said frame, a cutting implement slidably mounted in said inclined shaft and held in position by locking means so as to revolve with said inclined shaft, and a base member cooperative with said cutting member like a shear.

2. In a machine of the class described in combination, a frame, a rotary main axle supporting said frame, and carried by a travelling wheel, a cutting implement mounted on a rotatable inclined shaft operated by said main axle through toothed gears, said implement comprising a hub with a plurality of radially projecting arms, the free end of each arm provided with a knife, the edges of said knives forming parts of a common circle inclined towards the horizontap plane and with its center on the center line of said inclined shaft, a base member cooperating with said knives like shears, said base member being flexible and provided to slip on the ground yieldingly supported by the frame of the machine and spring loaded in direction towards the ground.

In testimony whereof I have affixed my signature.

HUGO J. V. KLOO.